United States Patent [19]

Malmendier et al.

[11] 3,951,669
[45] Apr. 20, 1976

[54] FUSION SEALS AND SEALING COMPOSITIONS FOR THEIR PRODUCTION

[75] Inventors: Joseph W. Malmendier, Corning; Francis W. Martin, Painted Post; Brian P. Tyndell, Beaver Dams, all of N.Y.

[73] Assignee: Corning Glass Works, Corning, N.Y.

[22] Filed: Nov. 18, 1974

[21] Appl. No.: 524,676

[52] U.S. Cl. .............................. 106/39.6; 106/47 R; 106/49; 106/53; 428/428
[51] Int. Cl.² .................... C03C 3/22; C03C 12/00
[58] Field of Search ............ 106/49, 39.6, 53, 39.7, 106/39.8, 47 R

[56] References Cited
UNITED STATES PATENTS

| | | | |
|---|---|---|---|
| 3,249,460 | 5/1966 | Gerry | 106/49 X |
| 3,250,631 | 5/1966 | Lusher | 106/49 |
| 3,258,350 | 6/1966 | Martin | 106/49 |
| 3,485,648 | 12/1969 | Bishop | 106/53 |
| 3,545,989 | 12/1970 | Mikoda et al. | 106/49 |
| 3,673,049 | 6/1972 | Giffen et al. | 106/39.6 |
| 3,681,097 | 8/1972 | Beall | 106/39.6 |
| 3,776,764 | 12/1973 | Takagi et al. | 106/49 |

FOREIGN PATENTS OR APPLICATIONS

| | | | |
|---|---|---|---|
| 38-3269 | 4/1963 | Japan | 106/39.6 |
| 6,516,586 | 6/1967 | Netherlands | 106/39.6 |

OTHER PUBLICATIONS

McMillan, P. W. et al., – Chem. Abstracts 71 (1969), p. 264, 73572p, "Crystal Growth Studies in Zinc Oxide–Alumina–Silica Glasses".

Primary Examiner—Helen M. McCarthy
Attorney, Agent, or Firm—Clinton S. Janes, Jr.; Clarence R. Patty, Jr.

[57] ABSTRACT

This invention relates to sealing mixtures consisting essentially of a sealing glass having a low sealing temperature and a high coefficient of thermal expansion, and a glass-ceramic additive that imparts a lower effective coefficient of expansion to the sealing mixture with a minimum effect on glass flow at the sealing temperature. It further concerns the use of this mixture to produce fusion seals between elements, particularly elements in electrical and electronic components.

9 Claims, No Drawings

FUSION SEALS AND SEALING COMPOSITIONS FOR THEIR PRODUCTION

BACKGROUND OF THE INVENTION

The joining together of component parts or elements is a major problem in both the assembly and packaging of electrical and electronic devices and equipment. Traditionally, glass parts have been sealed to each other, or to ceramic or metal parts, by a direct process wherein the sealing surface of a glass part is thermally softened to the point where it will wet the sealing surface of another part. The sealing surfaces are then brought together with suitable working to effect an appropriate seal. This process is eminently successful where distortion of the glass member is tolerable, and where there are no thermally sensitive parts involved in the sealed product.

Where the distortion inherent in direct sealing cannot be tolerated, it is common practice to use an intermediate sealing material. In the event a hermetic and/or thermally resistant seal is required, a soft sealing glass, commonly referred to as a solder glass, may be used. The solder glass used in making such a seal must be one having a softening temperature well below the deformation temperature of any surface to which it is applied so that the glass can flow and wet the sealing surface at a temperature below that at which such surface becomes deformed. Also, the well-known rules of matching thermal expansion coefficients must be observed.

PRIOR ART

Typical lead borosilicate solder sealing glasses are disclosed for example in U.S. Pat. No. 2,642,633 issued June 23, 1953 to R. H. Dalton. Lead borate and lead-zinc-borate and -borosilicate glasses are also well known as soft or solder sealing glasses. The devitrified glass seal is disclosed in Reissue 25,791 granted June 8, 1965 to S. A. Claypoole, and was developed to provide a low sealing temperature without correspondingly reducing the use temperature of the finished product.

Experience has shown that, as a general rule, the thermal coefficient of expansion of a sealing glass increases as the sealing or softening temperature of that glass decreases. Consequently, most soft sealing glasses which can flow at relatively low temperatures (below 400°C.) have coefficients of thermal expansion in excess of $100 \times 10^{-7}$/°C. Such expansion coefficients are too high to permit satisfactory sealing to many materials currently used in electrical and electronic manufacturing operations.

It has been proposed to solve this problem by physically incorporating into a sealing glass a ceramic additive which has a relatively low coefficient of thermal expansion. This provides a mixture having a coefficient of expansion intermediate that of the additive and the glass to which it is added without substantially increasing the sealing temperature. This practice is described for example in U.S. Pat. No. 3,258,350 issued June 28, 1966 to F. W. Martin and F. Zimar and in U.S. pat. No. 3,734,702 issued May 22, 1973 to F. Veres. The ceramic additive zircon, as described in the Martin and Zimar patent, has proven particularly useful because of its chemically inert nature. The Veres patent describes aluminum titanate as an additive to a thermally devitrifiable glass, and claims that it delays crystallization of the glass, thus providing more opportunity for good seal formation.

THE INVENTION

One problem, encountered when a ceramic expansion modifier is added to a sealing glass, is that of glass flow at sealing temperature. Thus, the additive tends to thicken the sealing glass and interfere with flow, thereby limiting use of this corrective measure. We have now discovered a novel sealing mixture characterized by an additive that has a minimal effect on glass flow at the sealing temperature while effecting a substantial decrease in the coefficient of expansion of the mixture.

The sealing mixture of our invention consists essentially of a sealing glass having a sealing temperature lower than the lowest deformation temperature of the materials being sealed and a high coefficient of thermal expansion and, as an additive to reduce the effective coefficient of thermal expansion, an effective amount up to 35% by volume of a $ZnO-Al_2O_3-SiO_2$ glass-ceramic material in which the crystal content consists essentially of a zinc beta-quartz solid solution. The invention further contemplates a fusion type seal produced from the mixture defined above, as well as the use of the $ZnO-Al_2O_3-SiO_2$ glass-ceramic material as an additive to reduce the effective thermal expansion coefficient of a sealing glass.

GENERAL DESCRIPTION

The additive of the present invention is effective to modify the expansion characteristics of any of the numerous known solder sealing glasses including both stable glasses and thermally devitrifiable glasses such as mentioned earlier with reference to the Dalton and Claypoole patents, respectively. In general, such glasses are predominantly composed of lead oxide in conjunction with relatively small amounts of boric oxide and/or silica as glass forming oxides. Frequently such glasses also contain zinc oxide, and up to a few percent of other known glassmaking oxides, such as the remaining divalent metal oxides, alumina and tin oxide, may be present on occasion. These lead glasses are commonly referred to as lead borate and borosilicate glasses including the corresponding zinc oxide glasses.

While the present invention may be practiced with any of these known types of glasses, it is particularly effective when used with a halide modification of the known lead glasses. These halide modified glasses generally contain at least one percent halogen and up to about ten percent as an agent to soften the glass, that is lower its softening point, below about 400°C. It is customary to use a fluoride as the modifying halide, but it will be understood that the other halides may be used in corresponding manner, particularly the chlorides.

Typically, these halide modified lead solder glasses may contain, on the oxide basis as calculated from the glass batch:

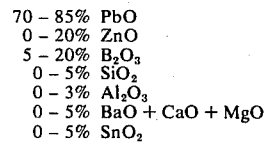

```
70 – 85% PbO
 0 – 20% ZnO
 5 – 20% B_2O_3
 0 – 5%  SiO_2
 0 – 3%  Al_2O_3
 0 – 5%  BaO + CaO + MgO
 0 – 5%  SnO_2
``` plus up to 10% of a halogen, such as fluorine, the halogen being considered separately from the calculated oxide composition since its cation association in the glass is not known. The addition of a halogen such as fluorine tends to lower the glass viscosity at a given temperature and thus lower the effective sealing temperature. In general, the halide modified glasses are capable of forming seals below 400°C. However, the amount of halogen that can be successfully retained in the glass makes additions over about 10% impractical.

The additive is modified, beta-quartz type glass-ceramic material composed essentially of silicon, aluminum and zinc oxides. We prefer to use a material containing 45–65% $SiO_2$, and additionally containing ZnO and $Al_2O_3$. With less than 45% $SiO_2$, the glass becomes difficult to melt and there may be a tendency to form other crystal phases. The zinc and alumina are preferably in equal, or one-to-one molar ratio although the ratio may vary by about 10%, that is from a ratio of 0.9 up to one of 1.1, without serious consequences. These oxides substitute for silica in the beta-quartz structure of the crystallized glass in a manner more fully described in an article by Petzoldt in Glastechnische Berichte, Vol. 40, pages 385–396 (1967), and in U.S. Pat. No. 3,681,097 granted Aug. 1, 1972 to G. H. Beall and F. W. Martin. At least 35% ZnO + $Al_2O_3$ is required to provide adequate substitution for present purposes.

The solder glass may be produced in known manner from conventional materials. In the preferred, halide-modified glasses, the halogen content is customarily introduced into the glass batch as a metal halide such as the fluoride or chloride of zinc and/or lead. It is conventional practice to "frit" the sealing glass in preparation for use, that is to reduce it to finely divided form for application as a slurry, as a molded ring or gasket, or other suitable manner.

The glass-ceramic additive may also be prepared in conventional manner as previously described. In particular, the zinc beta-quartz crystal phase may be separated by heat treatment of a glass of suitable composition at temperatures as low as 860°C. The crystallized material is then reduced to finely divided form for mixing with the solder glass.

The mixture may then be molded, mixed with a suitable vehicle, or otherwise prepared for normal sealing glass application. As mentioned earlier, the present mixture is preferably one adapted to forming a glass (either stable or crystallized) seal at a temperature not over about 400°C. With sealing glasses and applications requiring higher sealing temperatures, there appears to be a tendency for some reaction to occur, thus limiting the effectiveness of the additive as an expansion reducing agent.

It is a particular feature of the present additive that it has a minimal inhibiting effect on the ability of the sealing glass to flow and provide a well-formed seal at the sealing temperature. Flow is impeded by heavier loading of additive, and we prefer to employ no more than about 35% by volume where flow is a factor. It has also been found that flow is retarded as particle size is reduced, and hence materials substantially in the range of 100 to 400 mesh size are preferred. It will be noted that mesh sizes, as used herein, refer to U.S. Standard Sieve sizes.

SPECIFIC EMBODIMENTS

The invention is further described with reference to the following illustrative and comparative examples which should be construed as illustrating, rather than limiting the scope of, the invention.

EXAMPLE 1

Oxides of zinc, aluminum and silicon were intimately mixed in proportions by weight of 20% ZnO, 25% $Al_2O_3$ and 55% $SiO_2$. The glass batch thus formed was crucible melted in an electric muffle furnace, poured into water (drigaged), and milled to pass a 200 mesh screen with an average particle size of about 25 microns. Separate samples were heated for different lengths of time and/or at different temperatures to determine optimum conditions for conversion of the glass to a crystalline beta-quartz type structure. The following table sets forth the conditions of heat treatment, with time in hours (hrs.), temperature in degrees Centigrade (°C.), and the major and minor crystal phases observed by X-ray diffraction techniques after treatment.

TABLE I

| Time (hrs.) | Temp. (°C.) | Major Phase | Minor Phase |
|---|---|---|---|
| 16 | 860 | beta-quartz | — |
| 4 | 860 | beta-quartz | — |
| 4 | 890 | beta-quartz | — |
| 4 | 920 | beta-quartz | zinc aluminate (trace) |
| ½ | 920 | beta-quartz | — |
| ½ | 950 | beta-quartz | zinc aluminate (trace) |
| ½ | 1050 | beta-quartz zinc aluminate | cristobalite |
| ½ | 1150 | zinc aluminate beta-quartz | cristobalite |

It is apparent that, for present purposes, this glass should be crystallized by heat treating within the range of 850°–950°C. at times varying from several hours down to several minutes at the upper end of the range. It is of course desirable to obtain substantially complete crystallization without development of other phases such as the spinel, zinc aluminate. The optimum heat treatment for any composition may be readily determined in the manner illustrated. The zinc-modified beta-quartz glass-ceramic material thus produced has a negative thermal expansion coefficient of 1.67 ppm./°C. over the range 25° to 600°C.

Additional glasses which behave in a similar manner, and which might be used in place of that shown, include glasses consisting in weight % of (1) 60% $SiO_2$, 17.7% ZnO and 22.3% $Al_2O_3$, (2) 65% $SiO_2$, 15.5% ZnO, and 19.5% $Al_2O_3$, (3) 45% $SiO_2$, 24.4% ZnO, and 30.6% $Al_2O_3$.

EXAMPLE 2

A solder sealing glass was melted having the following composition: 80% PbO, 8.5% ZnO, 10% $B_2O_3$, 1.5% $SiO_2$, and 4.8% excess F. Thus the excess fluoride content represents the total fluoride minus the oxide equivalent whereby the cations are shown entirely as oxides. This glass was melted from a batch composed of, in parts by weight: 2,144 fumed litharge, 2,156 red lead, 974, 85% lead silicate, 828 zinc oxide, 974 boric oxide and 3,014 lead fluoride.

The glass obtained had a softening point of 300°C. and an average coefficient of thermal expansion of 131 $\times 10^{-7}$/°C. This glass was crushed and a molded expansion bar prepared. The bar was fired at 400°C. for 15 minutes and yielded a bar of crystallized material having a thermal coefficient of expansion of $130 \times 10^{-7}/°C$. over the temperature range of 25° to 200°C. (25°–200°C.). The glass was crushed to pass a 200 mesh screen, and is used as such in the succeeding examples unless otherwise indicated.

EXAMPLE 3

A quantity of the glass of Example 1 was crystallized for ½ hour at 900°C. to produce a crystallized material consisting substantially completely of a zinc-modified beta-quartz. This crystallized material was crushed and a −325 + 400 mesh fraction was selected for mixture with a quantity of the glass described in Example 2. The mixture contained 14% by volume of the zinc beta quartz additive and the remainder sealing glass.

A sample of the mixture thus formed was fired at 375°C. for fifteen (15) minutes to partially crystallize the glass and sinter the mixture. The material thus produced had a thermal expansion coefficient of $110 \times 10^{-7}/°C$. over the range 25° to 200°C. A corresponding mixture fired at 400°C. for 15 minutes produced a material having an expansion coefficient of $108 \times 10^{-7}/°C$. (25°–200°C.).

EXAMPLE 4

Pellets having a diameter of 0.5 inch (1.27 cm.) were pressed from 14% by volume mixtures prepared in accordance with Example 3, but employing varying batches of zinc beta quartz material differing in particle size. The pellets produced were fired at 375°C. for 15 minutes on a sintered alumina substrate. The diameter of the fired pellet represented a measure of the degree of flow occurring in the mixture during firing. A diameter less than 0.5 inch (1.27 cm.) indicates that the pellet sintered and consolidated, but did not undergo any appreciable flow.

The following table shows the mesh size range or fraction of zinc beta-quartz employed, and the diameter of the corresponding pellet after firing:

| Mesh Size | Diameter in. | cm. |
| --- | --- | --- |
| −100+200 | 0.558 | 1.42 |
| −200+270 | 0.536 | 1.36 |
| −270+325 | 0.513 | 1.30 |
| −325+400 | 0.509 | 1.29 |

It is apparent that the degree of flow during firing decreases as the additive particle size decreases. On the other hand, the particle size must not be so large as to interfere with smooth application of the mixture and seal formation. Also, with material over about 200 mesh size, there is a strong tendency for microcracking to occur, thus preventing the formation of a hermetic seal. On the other hand, any substantial amount of very fine material interfers with flow as shown above. Therefore, we prefer to use material within the range of 200 to 400 mesh size.

EXAMPLE 5

The additive heretofore used commercially has been zircon. Accordingly, pellets as described in Example 4 were prepared using the glass of Example 2 and loading two sets of pellets with zircon (−325+400 mesh) and two sets with the zinc beta quartz material as in Example 4. In both cases the amount of additive was 14% by volume and the pressed pellets had a half inch (1.27 cm.) diameter.

One set of each was fired at 375°C. for 15 minutes, while the other set of each was fired at 400°C., also for 15 minutes. In each case the pellets were fired on a sintered alumina substrate. The average diameters of the fired pellets were measured as follows:

| Additive | Firing Temp. (°C.) | Exp. Coef./°C. (25–200°) | Diameter in. | cm. |
| --- | --- | --- | --- | --- |
| zircon | 375° | 105 | 0.473 | 1.20 |
| zircon | 400° | 106.5 | 0.478 | 1.21 |
| beta quartz | 375° | 110 | 0.515 | 1.31 |
| beta quartz | 400° | 108 | 0.534 | 1.36 |

It is apparent that the beta-quartz material has substantially less inhibiting effect on flow during sealing.

EXAMPLE 6

The present zinc beta-quartz additive was added to a low melting, stable sealing glass, commercially available from Corning Glass Works under the designation Code 8463. This glass, in weight percent on an oxide basis, consisted of: 5% $SiO_2$, 10% $B_2O_3$, 3% $Al_2O_3$, 81.75% PbO and 0.25% $Sb_2O_3$. It has a softening point of 377°C. and a coefficient of thermal expansion (25°–200°C.) of $99.3 \times 10^{-7}/°C$.

Mixtures of powdered glass and additives were prepared and mixed with a standard organic vehicle, nitrocellulose in amylacetate. Both the beta-quartz material of Example 1 and the zircon material were added in 14% by volume amounts and in varying particle size ranges to compare effects. The resulting batches were pressed to form ¼ × ¼ × 4 inches (0.64 × 0.64 × 10.2 cm.) expansion bars which were then fired at 425°C. for 15 minutes. Thermal coefficient of expansion measurements over the range of 25° to 200°C. were made and are recorded below with the materials being identified by name and mesh size range used in the bars produced.

| Mesh Size | Zircon | Beta-Quartz |
| --- | --- | --- |
| −100+200 | 69.2 | 47.0 |
| −200+250 | — | 52.4 |
| −200+270 | 78.4 | — |
| −250+270 | — | 69.3 |
| −270+325 | 83.8 | — |
| −270+400 | — | 82.0 |

These examples indicate that comparable amounts of beta-quartz as an additive lower the expansion more than zircon. Likewise, as indicated in Example 4 the effect on expansion diminishes as particle size diminishes. Where material of −100+200 mesh size is employed, it is probable that at least some microcracking has occurred in the fired material.

EXAMPLE 7

Mixtures as described in Example 6, that is 14% by volume mixtures of zircon and zinc beta-quartz glass-ceramic in the glass of this example, were produced with −325+400 mesh size material being employed. These were pressed into half inch (1.27 cm.) diameter pellets which were fired at 450°C. for 15 minutes. A glass pellet without additive, when fired in similar manner, has a diameter of 0.568 inches (1.44 cm.). The zinc beta-quartz samples had a fired diameter of 0.511 inches (1.30 cm.) and the coefficient of expansion was decreased to 83.5 × 10⁻⁷/°C., whereas the zircon samples had a fired diameter of 0.520 inches (1.32 cm.) and an expansion of 85.5 × 10⁻⁷/°C. This suggests that, while zinc beta-quartz is a useful additive at higher firing temperatures, its advantage tends to be diminished.

EXAMPLE 8

Flow buttons or pellets were produced as described in Examples 6 and 7 except that a sealing glass having the following composition was used: $SiO_2$ 2%, ZnO 11%, $B_2O_3$ 9.3%, PbO 75.8%, and BaO 1.9%. This glass was melted from a batch composed in parts by weight of: 324.5 fumed litharge, 94.5 boric oxide, 321.1 red lead, 130.7 85% lead silicate, 110.2 zinc oxide, and 25.0 barium carbonate.

When these buttons were fired at 450°C. for 15 minutes, the following data was measured on the fired material:

| Additive | Exp. Coef. °C. (25–200°C.) | Diameter in. | cm. |
|---|---|---|---|
| none | 100.6 | — | — |
| zircon | 83.4 | 0.555 | 1.41 |
| zinc beta-quartz | 84.3 | 0.564 | 1.43 |

EXAMPLE 9

The sealing glass of Example 2 was mixed with varying amounts of the zinc beta-quartz additive as described in Example 1. Expansion bars were pressed from each of the different mixtures and the average coefficients of thermal expansion over the range 25° to 200°C. were measured after firing the bars at 375°C. for 15 minutes.

In one set of expansion bars, the glass was −200 mesh and the additive −100+200 mesh. In this case, microcracking occurred in the bars on firing, but rather substantial changes in expansion resulted as shown in the following table:

| Volume % additive | Exp. Coef. × 10⁻⁷/°C. |
|---|---|
| 10 | 66.8 |
| 12 | 64.3 |
| 14 | 59.8 |
| 16 | 52.7 |
| 18 | 49.3 |

A similar set of samples was prepared and treated in the same manner as above, except that the additive was ground more finely to pass a 200 mesh screen. The average expansion coefficients (25°–200°C.) measured on bars containing different volume percents of zinc beta-quartz as an additive are shown:

| Volume % additive | Exp. Coef. × 10⁻⁷/°C. |
|---|---|
| 15 | 101.8 |
| 18 | 97.8 |
| 21 | 94.3 |
| 24 | 90.6 |
| 27.5 | 86.1 |
| 31 | 81.9 |

It may be noted that the amount and particle size of additive permitted will depend, in addition to factors illustrated above, on the flow requirements of the application, and the need for hermeticity. Thus, if merely a sintered joint or coating suffices, a fairly heavy loading can be tolerated. Likewise, if hermeticity is not required, and microcracking can be tolerated, a substantially greater range of expansion change is available as shown above. Other variations and modifications of the invention will be apparent to those skilled in this art.

We claim:

1. A sealing mixture for use in sealing to a glass surface consisting essentially of a lead borate, a lead-zinc borate, a lead borosilicate, or a lead-zinc borosilicate sealing glass having a softening temperature below about 400°C. and a coefficient of thermal expansion in excess of about 99 × 10⁻⁷/°C. (25°–200°C.) and, as an additive to reduce the effective coefficient of thermal expansion of said sealing glass, an effective amount in the form of particles within the range of about 100–400 mesh size up to about 35% by volume of a $ZnO$-$Al_2O_3$-$SiO_2$ glass-ceramic material having a coefficient of thermal expansion less than that of said sealing glass consisting essentially, by weight, of about 45–65% $SiO_2$ and at least 35% ZnO + $Al_2O_3$, wherein ZnO and $Al_2O_3$ are present in molar ratios ranging between about 0.9–1.1, in which the crystal content constitutes greater than 50% by weight of said glass-ceramic material and consists essentially of zinc beta-quartz solid solution.

2. A sealing mixture in accordance with claim 1 wherein the sealing glass also contains up to about 10% of a halogen.

3. A sealing mixture in accordance with claim 2 wherein the halogen is fluorine.

4. A sealing mixture in accordance with claim 1 wherein the particles are within a range of 200 to 400 mesh size.

5. A method for reducing the effective coefficient of thermal expansion of a lead borate, a lead-zinc borate, a lead borosilicate, or a lead-zinc borosilicate sealing glass having a softening temperature below about 400°C. and a coefficient of thermal expansion in excess of about 99 × 10⁻⁷/°C. (25°–200°C.), which comprises mixing with said sealing glass an additive in the form of particles within the range of about 100–400 mesh size in an amount effective to reduce the effective coefficient of thermal expansion of said sealing glass up to about 35% by volume of a $ZnO$-$Al_2O_3$-$SiO_2$ glass-ceramic material having a coefficient of thermal expansion less than that of said sealing glass and consisting essentially, by weight, of about 45–65% $SiO_2$ and at least 35% ZnO + $Al_2O_3$, wherein ZnO and $Al_2O_3$ are present in molar ratios ranging between about 0.9–1.1, in which the crystal content constitutes greater than 50% by weight of said glass-ceramic material and consists essentially of zinc beta-quartz solid solution.

6. A method in accordance with claim 5 wherein the sealing glass also contains up to 10% of a halogen.

7. A method in accordance with claim 6 wherein the halogen is fluorine.

8. A method in accordance with claim 5 wherein the particles are in the range of 200 to 400 mesh size.

9. A method in accordance with claim 5 wherein the glass-ceramic additive is prepared by heat treating a parent glass in the temperature range of 850°–950°C.

* * * * *